United States Patent
Han

(10) Patent No.: US 12,488,386 B2
(45) Date of Patent: Dec. 2, 2025

(54) REAL-TIME AUCTION SYSTEM AND METHOD AND COMPUTER PROGRAM THEREFOR

(71) Applicant: AUTOWINI INC., Seoul (KR)

(72) Inventor: Ji Young Han, Seongnam-si (KR)

(73) Assignee: Autowini Inc., Seoul (KR)

( * ) Notice: Subject to any disclaimer, the term of this patent is extended or adjusted under 35 U.S.C. 154(b) by 243 days.

(21) Appl. No.: 17/916,156

(22) PCT Filed: Mar. 29, 2021

(86) PCT No.: PCT/KR2021/003818
§ 371 (c)(1),
(2) Date: Sep. 30, 2022

(87) PCT Pub. No.: WO2021/201523
PCT Pub. Date: Oct. 7, 2021

(65) Prior Publication Data
US 2023/0162275 A1    May 25, 2023

(30) Foreign Application Priority Data
Mar. 30, 2020 (KR) .......................... 10-2020-0038367

(51) Int. Cl.
*G06Q 30/08* (2012.01)
*G06Q 30/0201* (2023.01)

(52) U.S. Cl.
CPC ......... *G06Q 30/08* (2013.01); *G06Q 30/0206* (2013.01)

(58) Field of Classification Search
None
See application file for complete search history.

(56) References Cited

U.S. PATENT DOCUMENTS

| 2008/0147566 A1* | 6/2008 | Malik | G06Q 30/08 |
| | | | 705/36 R |
| 2013/0091047 A1* | 4/2013 | Hough | G06Q 40/04 |
| | | | 705/37 |

FOREIGN PATENT DOCUMENTS

| KR | 10-2001-0032547 | 4/2001 |
| KR | 10-2004-0083667 | 10/2004 |

(Continued)

OTHER PUBLICATIONS

J. Trevathan, W. Read, Y. J. Lee and I. Atkinson, "Targeting the Strategies of a Bid Sniper," 2011 44th Hawaii International Conference on System Sciences, Kauai, HI, USA, 2011, pp. 1-10, doi: 10.1109/HICSS.2011.396. (Year: 2011).*

(Continued)

*Primary Examiner* — Michelle T Kringen
(74) *Attorney, Agent, or Firm* — Fish & Richardson P.C.

(57) ABSTRACT

A real-time auction system includes a management server configured to receive item information related to a product of a seller and update the item information by receiving auction result information after an auction for the product is conducted; and an auction server configured to provide the item information to a user device of at least one auction participant, conduct the auction for the product by transmitting bid information of the auction to the user device in real time, and transmit the auction result information to the management server. The auction server may include a communication unit for transmitting the item information and the bid information to the user device through different data packets. The real-time auction system may reduce time differences between auction participants via communication of the item information and the bid information using different data packets and meet the diverse needs of auction participants from different countries.

15 Claims, 8 Drawing Sheets

(56) References Cited

FOREIGN PATENT DOCUMENTS

| | | | |
|---|---|---|---|
| KR | 10-045677 | 1/2005 | |
| KR | 10-2007-0095124 | 9/2007 | |
| KR | 10-1626921 | 6/2016 | |
| KR | 10-2020-0008451 | 1/2020 | |
| WO | WO-2011146648 A1 * | 11/2011 | ............ G06Q 30/08 |

OTHER PUBLICATIONS

International Search Report and Written Opinion in International Appln. No. PCT/KR2021/003818, mailed on Aug. 23, 2021, 6 pages.

* cited by examiner

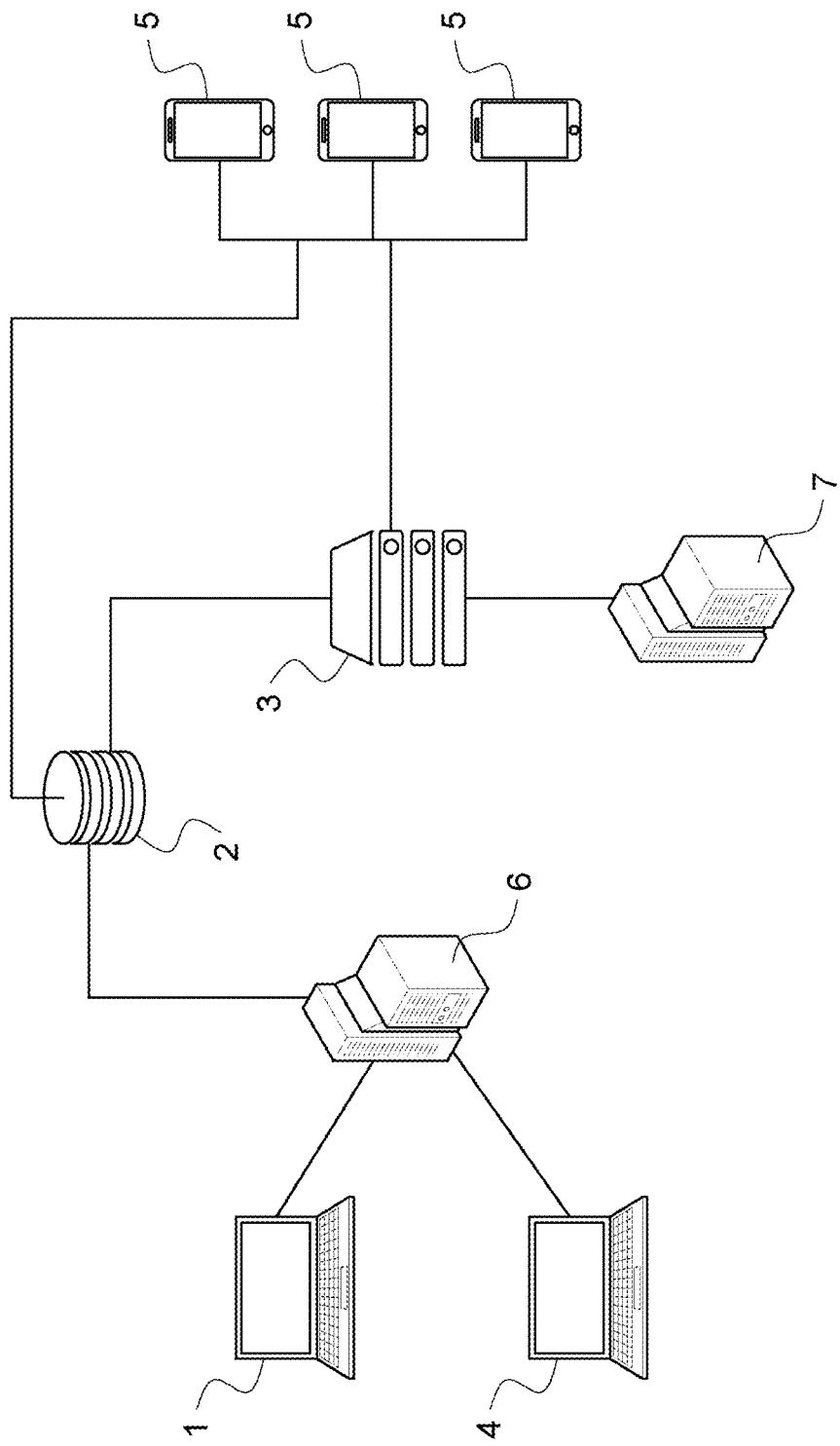
[FIG. 1]

[FIG. 2]
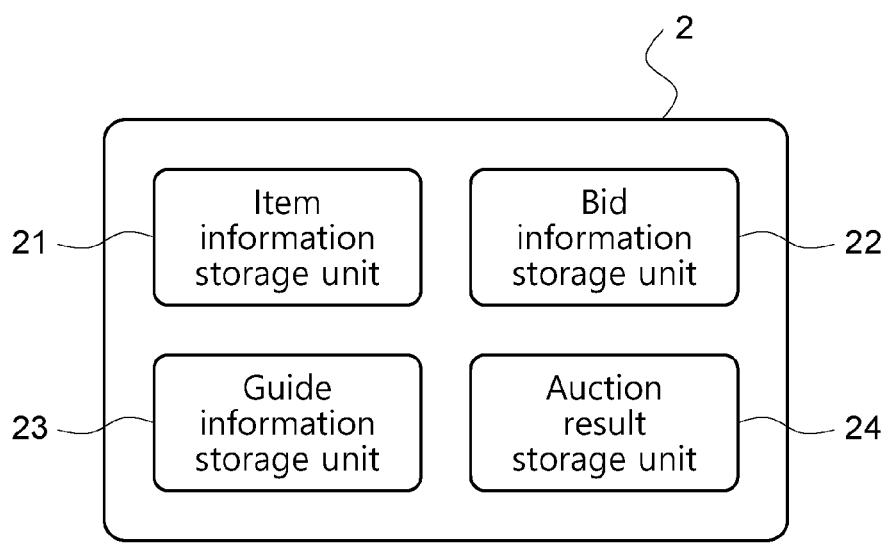

[FIG. 3]
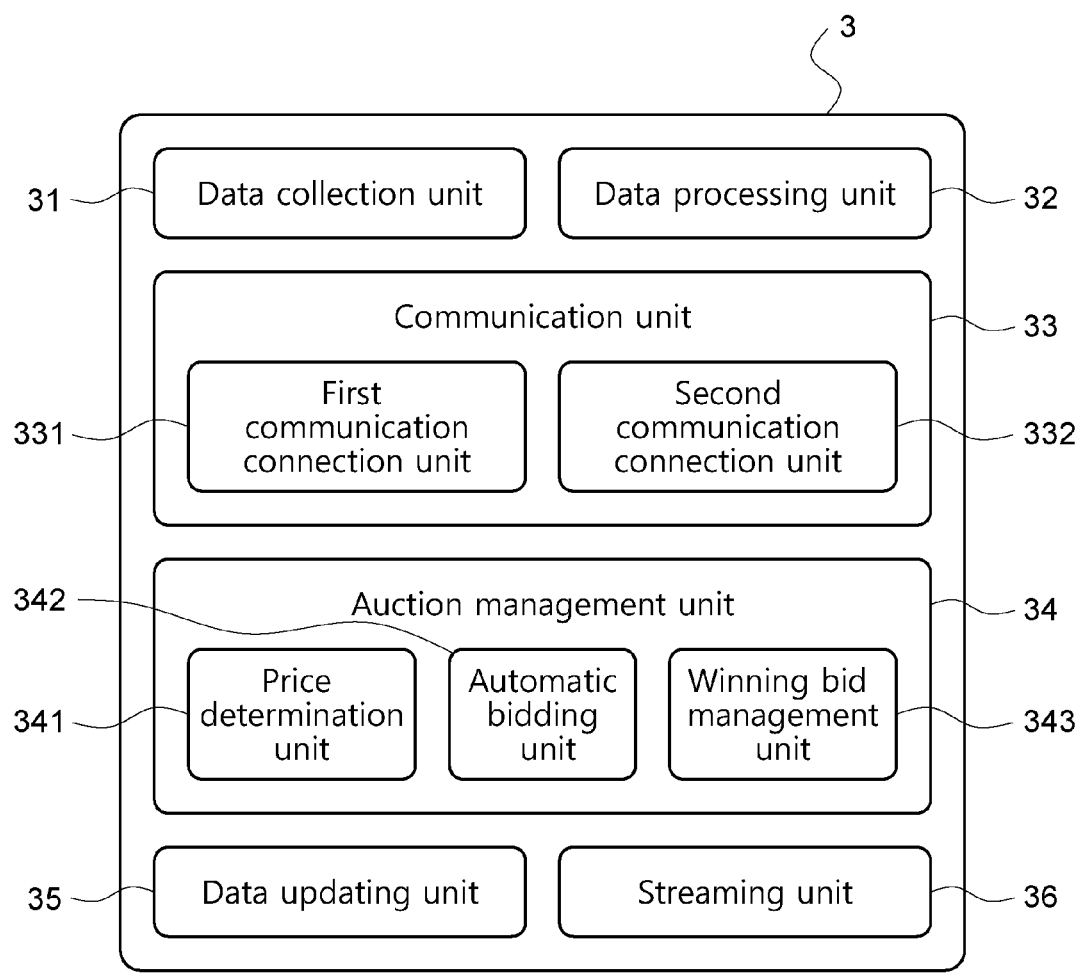

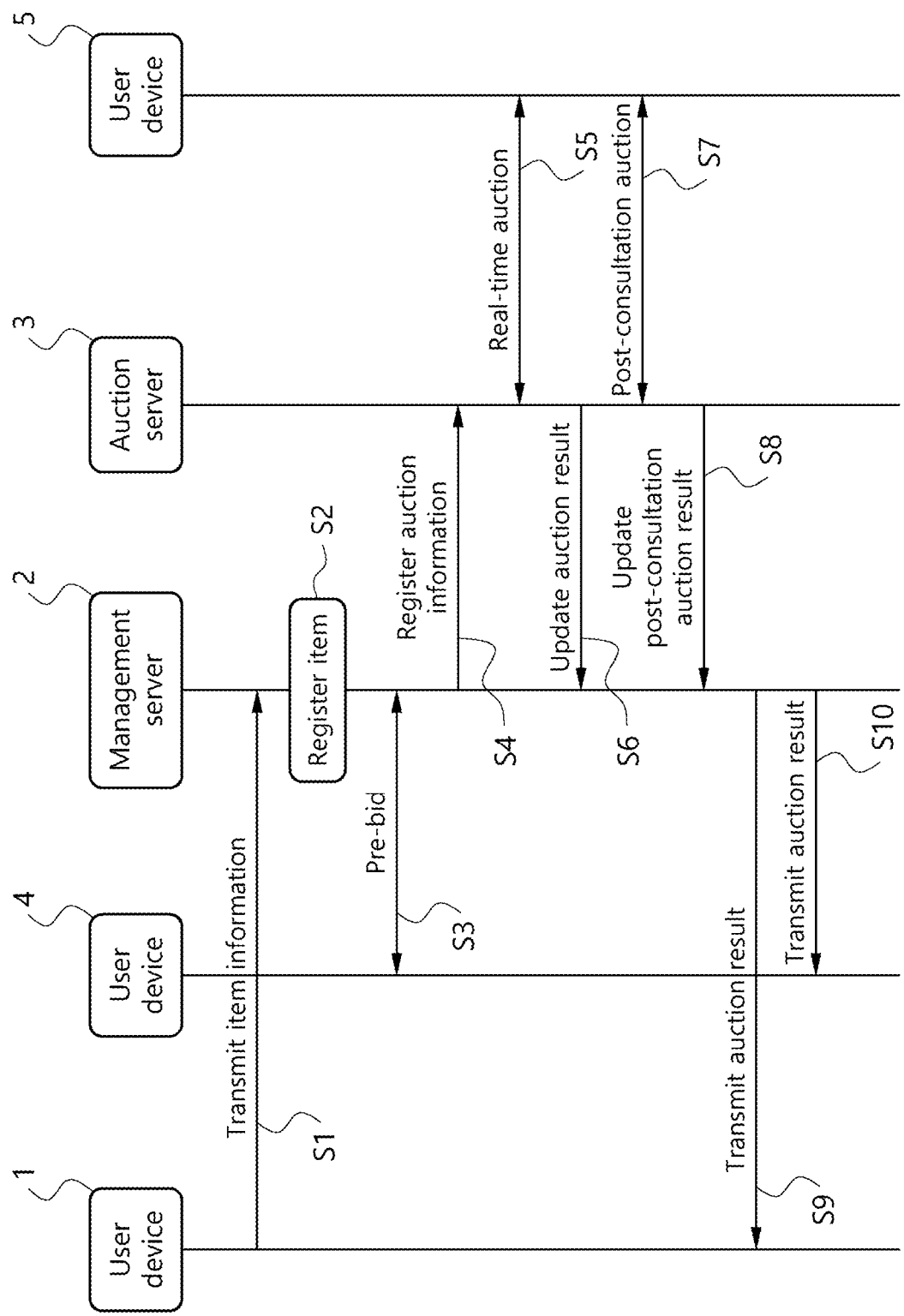
[FIG. 4]

[FIG. 5]
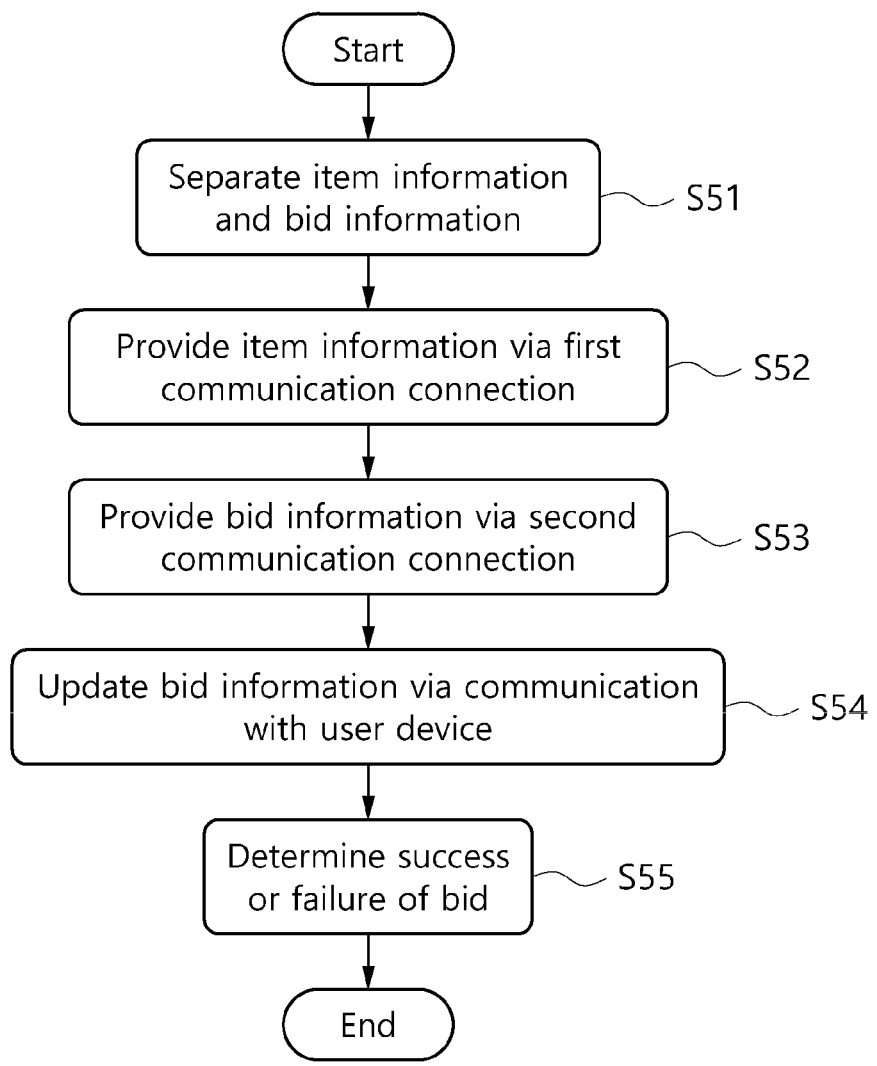

[FIG. 6]
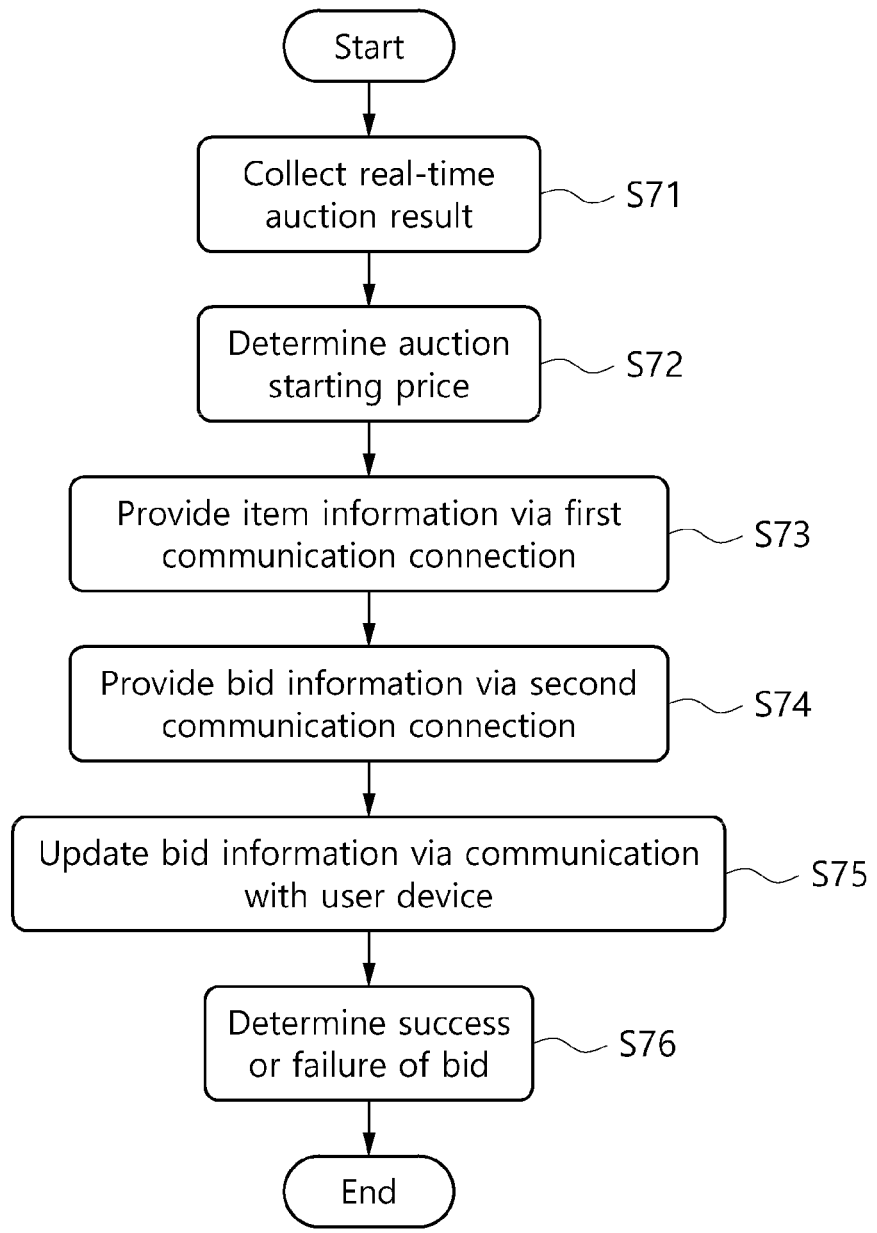

[FIG. 7]
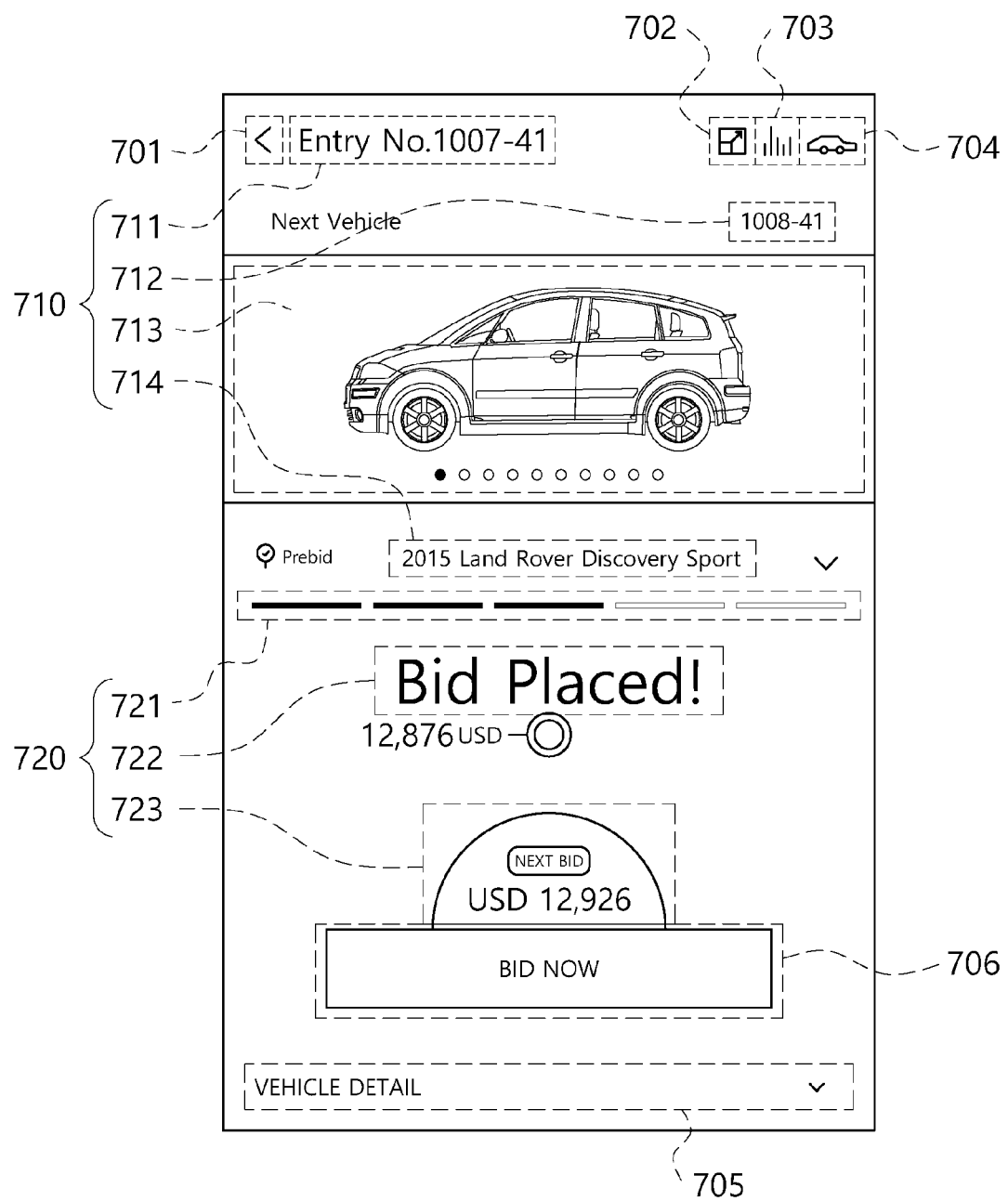

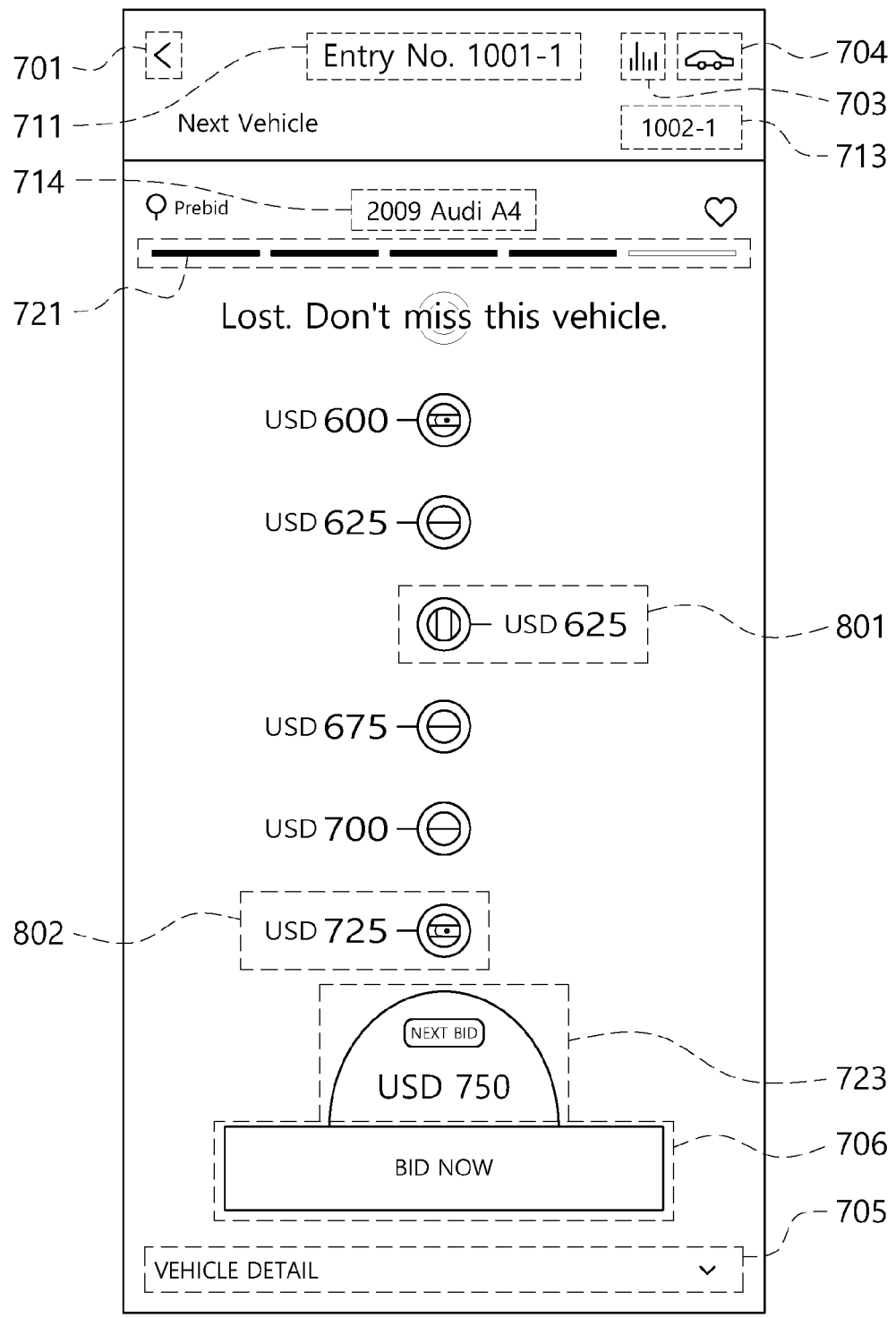
[FIG. 8]

REAL-TIME AUCTION SYSTEM AND METHOD AND COMPUTER PROGRAM THEREFOR

CROSS-REFERENCE TO RELATED APPLICATIONS

This application is a National Stage application under 35 U.S.C. § 371 of International Application No. PCT/KR2021/003818, having an International Filing Date of Mar. 29, 2021, which claims priority to KR Application No. 10-2020-0038367, having a Filing Date of Mar. 30, 2020.

The disclosure of the prior applications are considered part of the disclosure of this application, and are incorporated by reference in their entirety into this application.

TECHNICAL FIELD

Embodiments relate to a real-time auction system and method and a computer program therefor. More particularly, embodiments relate to a real-time auction platform for conducting auctions by a three-tier scheme, pre-bidding, real-time auction and post-consultation auction, to meet the diverse needs of auction participants all over the world, and for reducing time differences between auction participants via communication of item related information and bid information using different data packets.

BACKGROUND ART

With the recent rapid development of information and communication technology, most goods have become available for sale through the Internet. In this circumstance, there is used vehicle brokerage or trading business using the internet, and for example, Korean Patent No. 10-1626921 discloses a used car trading system for allowing used car brokers and individual customers to participate in used car auctions.

However, the conventional technologies including the used car trading system disclosed by Korean Patent No. 10-1626921 merely help to conduct transactions of used cars between sellers and buyers in the same country, and they lack consideration of global services for auction participants from different countries.

In the case of global auctions, auction participants are in different network environments, so there are time differences between the participants, and situations or tax related requirements are different in each country, which makes it difficult to determine appropriate market prices. However, the existing auction systems have difficulties in meeting the diverse needs of auction participants all over the world.

DISCLOSURE

Technical Problem

According to an aspect of the present disclosure, a real-time auction system and method and a computer program therefor are provided, which may conduct auctions by a three-tier scheme, pre-bidding, real-time auction and post-consultation auction, to accept the desired purchase prices of auction participants from different countries in diverse contexts, and for reduce time differences between auction participants in global auctions via communication of item related information and bid information using different data packets.

Technical Solution

A real-time auction system according to an embodiment includes: a management server configured to receive item information related to a product of a seller, and update the item information by receiving auction result information after an auction for the product is conducted; and an auction server configured to provide the item information to a user device of at least one auction participant, conduct the auction for the product by transmitting bid information of the auction to the user device in real time, and transmit the auction result information to the management server.

Herein, the auction server includes a communication unit configured to transmit the item information and the bid information to the user device through different data packets.

In an embodiment, the communication unit is further configured to transmit the item information to the user device via first communication connection and to transmit the bid information to the user device via second communication connection having a shorter update cycle than the first communication connection.

In an embodiment, the first communication connection and the second communication connection are different in at least one of a data format or a communication protocol.

In an embodiment, the auction server further includes a winning bid management unit configured to update the bid information via communication with the user device and determine a success or failure of the auction based on the bid information.

In an embodiment, the management server is further configured to receive lowest winning bid price information from the seller, and the winning bid management unit is further configured to designate the product as unsold when a highest bid price of an initial auction is less than the lowest winning bid price, and conduct a post-consultation auction for the product that goes unsold after the initial auction ends.

In an embodiment, the auction server further includes a price determination unit configured to determine a starting price of the post-consultation auction based on the highest bid price of the initial auction.

In an embodiment, the management server is further configured to receive pre-bid information including a desired bid price from a pre-bidder before the auction starts, and the auction server further includes an automatic bidding unit further configured to bid on behalf of the pre-bidder until the desired bid price is reached from the starting price after the auction starts.

A real-time auction method according to an embodiment includes: receiving, by a management server of a real-time auction system, item information related to a product from a seller; providing, by an auction server of the real-time auction system, the item information to a user device of at least one auction participant, and conducting an auction for the product by transmitting bid information of the auction to the user device in real time; transmitting, by the auction server, auction result information of the product to the management server; and updating, by the management server, the item information using the received auction result information.

Herein, the step of conducting the auction comprises transmitting, by the auction server, the item information and the bid information to the user device through different data packets.

In an embodiment, the step of transmitting to the user device through the different data packets includes: transmitting, by the auction server, the item information to the user device via first communication connection; and transmitting, by the auction server, the bid information to the user device via second communication connection having a shorter update cycle than the first communication connection.

The real-time auction method according to an embodiment further includes: before conducting the auction, receiving, by the management server, lowest winning bid price information from the seller, and after conducting the auction, designating, by the auction server, the product as unsold when a highest bid price of an initial auction is less than the lowest winning bid price; and conducting, by the auction server, a post-consultation auction for the product that goes unsold after the initial auction ends.

In an embodiment, the step of conducting the post-consultation auction comprises determining, by the auction server, a starting price of the post-consultation auction based on the highest bid price of the initial auction.

The real-time auction method according to an embodiment further includes: before conducting the auction: receiving, by the management server, pre-bid information including a desired bid price from a pre-bidder before the auction starts, wherein the step of conducting the auction comprises, by the auction server, bidding on behalf of the pre-bidder until the desired bid price is reached from a starting price after the auction starts.

A computer program according to an embodiment is stored in a computer-readable recording medium to execute the real-time auction method according to the above embodiments in combination with hardware.

Advantageous Effects

Using the real-time auction system and method according to an aspect of the present disclosure, since vehicle sellers and buyers from different countries are directly connected through the real-time auction system, it is possible to take advantage of direct trade, and since auctions are conducted by the three-tier scheme, pre-bidding, real-time auction and post-consultation auction, it is possible to accept the desired purchase prices of auction participants from different countries in diverse contexts and draw the maximum prices of bidders, thereby maximizing the sellers' profits.

Additionally, the real-time auction system according to an aspect of the present disclosure may be configured to communicate auction item related information and bid information of auction participants by different methods. For example, item related information such as vehicle information and bid information such as bid prices and bidders are transmitted in each separate data packet format, thereby reducing time differences between auction participants from different countries.

DESCRIPTION OF DRAWINGS

FIG. 1 is a schematic block diagram of a real-time auction system according to an embodiment.

FIG. 2 is a schematic block diagram of a management server of a real-time auction system according to an embodiment.

FIG. 3 is a schematic block diagram of an auction server of a real-time auction system according to an embodiment.

FIG. 4 is a flowchart of a real-time auction method according to an embodiment.

FIG. 5 is a flowchart showing a real-time auction process by a real-time auction method according to an embodiment.

FIG. 6 is a flowchart showing a post-consultation auction process of a real-time auction method according to an embodiment.

FIGS. 7 and 8 are conceptual diagrams showing exemplary user interfaces on a user device using a real-time auction method according to an embodiment.

MODE FOR INVENTION

Hereinafter, embodiments of the present disclosure will be described in detail with reference to the accompanying drawings.

FIG. 1 is a schematic block diagram of a real-time auction system according to an embodiment.

Referring to FIG. 1, the real-time auction system according to this embodiment includes a management server 2 and an auction server 3. The management server 2 is configured to receive and register item information via communication with a user device 1 of a seller who wants to sell his/her item through an auction. Additionally, the management server 2 may receive pre-bid information before the start of a real-time auction via communication with a user device 4 of a participant who submits a pre-bid of the auction, and it will be described in detail.

In an embodiment, the auction server 2 may be configured to communicate with the user devices 1, 4 via a web server 6 that provides a web page or a mobile web page that the user devices 1, 4 can access. However, this is provided by way of illustration, and each device and each server of the real-time auction system may operate in communication with each other via an arbitrary wired and/or wireless network. The communication method via the wired and/or wireless network may include any communication method for networking between objects, and is not limited to wired communication, wireless communication, 3G, 4G or other methods.

For example, the wired and/or wireless network may refer to a communication network by at least one communication method selected from the group consisting of Local Area Network (TDMA), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), LTE Advanced, IEEE802.16m, WirelessMAN-Advanced, HSPA+, 3GPP Long Term Evolution (LTE), Mobile WiMAX (IEEE 802.16e), UMB (formerly EV-DO Rev. C), Flash-OFDM, iBurst and MBWA (IEEE 802.20) systems, HIPERMAN, Beam-Division Multiple Access (BDMA), World Interoperability for Microwave Access (Wi-MAX) or communication using ultrasonic waves, but is not limited thereto.

The management server 2 may register the item information received from the seller in the auction server 3. The auction server 3 proceeds with the real-time auction for the item registered through the management server 2 via communication with a user device 5 of at least one auction participant. Prior to or concurrently with the real-time auction, the management server 2 may be further configured to provide the pre-bid information of the corresponding item to the user device 5 of the auction participant. Each time the real-time auction for a single item or a specific number of items ends, the auction server 3 may update the item information of the management server 2 by transmitting the auction result information to the management server 2.

The auction item is described herein by taking a vehicle product as an example, and in this instance, the vehicle product refers to a vehicle itself or a component or consumable that is coupled or provided inside or outside of the vehicle to perform the operation related to the vehicle. Although the vehicle product is described herein especially by taking a used car as an example, the product that is traded through the real-time auction system according to embodiments is not limited to a particular type of product and may be a new car, not a used car, and a component of the car or a consumable related to the car, or any other type of item than the car.

The real-time auction system according to embodiments may have aspects of entirely hardware, or partly hardware and partly software. For example, each server 2, 3 included in the real-time auction system and each unit of them may refer collectively to hardware for processing data of a specific format and content and/or transmitting and receiving the data by an electronic communication method and its related software. The term "unit", "module", "device", "terminal", "server" or "system" as used herein is intended to refer to a combination of hardware and software that runs on the corresponding hardware. For example, the hardware may be a data processing device including central processing unit (CPU) or any other processor. Additionally, the software that runs on the hardware may refer to a process being executed, an object, an executable, a thread of execution and a program.

Additionally, each element of the real-time auction system according to these embodiments is not necessarily intended to refer to a separate device that is physically separated from each other. That is, each server 2, 3 of the real-time auction system as described herein and each unit of them is the functionally separated hardware according to the operation performed by the corresponding hardware, and each unit does not need to be independent of each other. Of course, according to embodiments, at least one of each server or each unit may be a separate device that is physically separated from each other.

FIG. 1 shows the user devices 1, 4 of the seller and the pre-bidding participant in the form of a laptop computer and the user device 5 of the auction participant in the form of a smartphone. However, the type of each user device is not limited thereto, and the user devices 1, 4, 5 may be any type of computing device, for example, a mobile communication terminal such as a smartphone, a personal computer, a personal digital assistant (PDA), a tablet computer, a set-top box for Internet Protocol Television (IPTV).

Additionally, it will be easily understood that the number of each user device 1, 4, 5 shown in FIG. 1 is provided by way of illustration for convenience of description, and does not represent the actual number of sellers, pre-bidding participants or real-time auction participants who use the real-time auction system. That is, the real-time auction system may operate to register items for sale of an arbitrary number of sellers and sell the items to an arbitrary number of bidders.

The auction participant who wants to participate in the real-time auction may search for the auction time of his/her desired item and a list of items on sale registered in the management server 2 by accessing the management server 2 using the user device 5. For example, the search process may be performed by the communication between the user device 5 and the management server 2 using Application Programming Interface (API), but is not limited thereto.

The auction by the auction server 3 may be conducted by transmitting information of the vehicle on sale at the auction to each user device 5 and updating bid information in such a manner that the auction server 3 receives bid information from the user device 5 of each user and transmits bid information of another user to the user device 5 of each user. Additionally, the auction server 3 may transmit time information, remaining time information and next item information to the user device 5 to conduct the auction. Meanwhile, the auction server 5 may conduct the auction for the vehicle in such a manner that an initial auction is conducted as a real-time auction, and when the initial auction fails, a post-consultation auction is conducted, and it will be described in detail.

In an embodiment, the auction server 3 may use additional information received via communication with an external server 7 to conduct the auction. For example, the external server 7 may be a broadcasting server that provides an auction host's video and/or audio information in the format of a stream, and the auction server 3 may update the bid information of the users and provide the broadcast streaming data to the user device 5 of each user to conduct the auction.

In an embodiment, the management server 2 may transmit auction result information to the user device 1 of the seller and/or the user device 4 of the pre-bidding participant. The auction result information may be reflected by updating the item information registered in the management server 2, or transmitting a separate notification to the user device 1 of the seller or the user device 4 of the pre-bidding participant.

FIG. 2 is a schematic block diagram of the management server of the real-time auction system according to an embodiment.

Referring to FIG. 2, the management server 2 may include an item information storage unit 21 to store the information of the auction item and an auction result storage unit 24 to store the real-time auction or post-consultation auction results of the corresponding item. The item information storage unit 21 and the auction result storage unit 24 are conceptually separated from each other and they are not necessarily physically separated from each other, and for example, the auction results may be updated by reflecting the item information stored in the management server 2 thereon, and the updated auction results may be stored.

The item information stored in the item information storage unit 21 may refer to arbitrary information used for the bidder to identify the product on sale at the auction. For example, in the case of the vehicle product, the item information may include vehicle information, for example, vehicle type, category (sedan, sport utility vehicle (SUV), etc.), manufacturer, age, grade, model, steering style, displacement, transmission, the number of seats, fuel type (diesel or gasoline, etc.), the number of doors, color, size, engine output, the number of cylinders, drive type (all-wheel drive, two-wheel drive, four-wheel drive, etc.) and options, and information of the vehicle's current condition (used or new), vehicle picture, vehicle description and vehicle price.

In an embodiment, the item information may include a vehicle condition report. The vehicle condition report may include information that indicates the condition of each part of the vehicle exterior, for example, corrosion, holes and cracks, and may indicate the operational condition of each vehicle interior component. For example, the vehicle exterior is divided into front bumper, hood, roof, trunk cover, rear bumper, left and right fenders, left and right front doors, left and right rear doors, left and right rocker panels and left and right quarter panels, and corrosion of each part and holes or cracks of the corresponding part may be indicated in the vehicle condition report. Additionally, the vehicle interior components may be divided into engine, transmission, braking system, air conditioner, heater, audio system, window switch and four-wheel drive system, and the operational condition of each component may be indicated in the vehicle condition report.

The vehicle condition report may be uploaded after it is prepared by the seller when uploading the item information, or may be generated by the management server 2 based on the information received by the seller. For example, the seller may generate the vehicle condition report that will be registered in the real-time auction system by specifying the condition related to the vehicle product that the seller wants to sell through the auction in checkboxes offered by the real-time auction system. Additionally, in an embodiment, the vehicle condition report may be automatically generated by detecting defects on the vehicle from the vehicle image received from the seller, for example, at least one of corrosion, holes or cracks in at least one part.

For example, in case that there are corrosion, holes or cracks on the vehicle exterior, a discontinuous region caused by the corrosion, holes, and/or cracks appears on the image of the vehicle surface of the corresponding part. In this instance, the discontinuous region refers to a region composed of pixels that change in the properties (for example, contrast, color, etc.) related to pixels corresponding to the vehicle on the image to a greater extent than the other regions of the image. The real-time auction system may divide at least one vehicle image uploaded by the seller into pixels corresponding to the background and pixels corresponding to the vehicle, and detect corrosion, holes and/or cracks on the exterior steel panel of the vehicle by detecting pixels having a large difference in contrast and color within the region in a closed loop surrounded by the pixels corresponding to the vehicle when compared with the other pixels in the corresponding region. Additionally, the real-time auction system may transmit the vehicle condition report automatically generated by image analysis as described above to the seller before registering the vehicle condition report as the item information, to allow the seller to confirm and approve the content of the vehicle condition report to be registered.

However, the type of the vehicle condition report is provided by way of illustration, and the type of information included in the vehicle condition report and how it is created may be different according to embodiments.

In an embodiment, the management server 2 further includes a bid information storage unit 22. Prior to the real-time auction by the auction server, the bid information storage unit 22 is configured to receive and store the pre-bid information from the pre-bidding participants and provide the pre-bid information to the auction server and the user devices of real-time bidding participants. In this instance, the pre-bidding participant may set, as part of the pre-bid information, a pre-bid price that refers to the highest price that he/she is willing to pay, and the pre-bid price of the pre-bidding participant may be transmitted to the auction server and used for automatic bidding in the real-time auction process as described below.

Additionally, in an embodiment, the management server 2 further includes a guide information storage unit 23. In the case of auctions, even though items on sale have the same feature, in many cases, winning bid prices are different depending on sellers' tendencies, and according to the features of auctions, winning bid prices of different items are kept in secret, so there is little basis for bidders to estimate the expected prices. To overcome this drawback, the guide information storage unit 23 may generate an expected winning bid price as guide information based on the corresponding item information, and provide the expected winning bid price to the auction participants as part of the item information. Additionally, the expected winning bid price may be provided to the seller who registers his/her item.

For example, in the case of the vehicle, the guide information storage unit 23 may determine the expected winning bid price that matches the corresponding vehicle product with reference to a winning bid history of a different vehicle that is similar to the vehicle product on sale at the auction and suggest the expected winning bid price to the seller and/or the auction participant. In this instance, the different vehicle that is similar to the vehicle product on sale at the auction may refer to a vehicle that is similar to the corresponding vehicle product in its price, condition (used, new, etc.), category (sedan, SUV, etc.), manufacturer, grade, model, age, steering style, displacement, transmission, the number of seats, fuel type (diesel or gasoline, etc.), the number of doors, color, position, vehicle size, engine output, the number of cylinders, drive type (all-wheel drive, two-wheel drive, four-wheel drive, etc.) and options.

In an embodiment, for each of the above-described element, when the corresponding element matches between the two vehicle products, scoring may be done, and the expected winning bid price may be determined by summing up the scores assigned to all the elements and calculating the degree of similarity between the two vehicle products. In this instance, the scores assigned to each element may be equivalently summed up, or the scores assigned to each element may be summed up in such a manner that the scores (for example, the scores of type, manufacturer, model, age, displacement, fuel type, etc.) for specific elements have higher weights than the scores (for example, the scores of the number of seats, the number of doors, color, options, etc.) for the other elements. The expected winning bid price may be a winning bid price of a vehicle product having the highest degree of similarity with the item on sale or an average price of winning bid prices of vehicle products having the degree of similarity of a predetermined level or more.

FIG. 3 is a schematic block diagram of the auction server of the real-time auction system according to an embodiment.

Referring to FIG. 3, the auction server 3 includes a communication unit 33 to transmit and receive the item information and the bid information via communication with the user device of the action participant, and an auction management unit 34 to conduct the auction while updating the bid information in real time upon participation of the auction participants.

The communication unit 33 is configured to transmit and receive the item information and the bid information to/from the user device through different data packets. To this end, the communication unit 33 includes a first communication connection unit 331 to transmit the item information to the user device via first communication connection and a second communication connection unit 332 to transmit/receive the bid information to/from the user device via second communication connection that is updated in a shorter cycle than the first communication connection. The first communication connection and the second communication connection may be communication sessions that differ in formats and/or communication protocols of data being transmitted and received. For example, the first communication connection unit 331 may transmit the item information to the user device in JSON format, and the second communication connection unit 332 may transmit and receive the bid information to/from the user device via TCP/IP socket communication, but is not limited thereto.

In this instance, the item information refers to information that does not need to be updated in real time, such as information of the product on sale at the auction, for example, the vehicle and its pre-bid information and the next item information, and the bid information refers to bid history of another user and remaining time data at the auction running in real time. According to the embodiments of the present disclosure, since the item information and the bid information are made into different data packets and the bid information is updated in a shorter cycle than the item information, it is possible to reduce the time differences between bidders who participate in the global auction to the maximum by updating only the bid information that is more important to reflect in real time separately from the item information.

In an embodiment, the auction server 3 further includes a data collection unit 31 and a data processing unit 32. The data collection unit 31 is configured to collect the item information and the pre-bid information registered in the management server 2 (FIG. 1). In this instance, the item information may include information about the auction running time set by the seller or determined by the real-time auction system. The data processing unit 32 is configured to process the collected item information or add some content to the collected item information to generate data to be transmitted as the item information via the first communication connection and data to be transmitted as the bid information via the second communication connection. In this instance, the data to be provided as the item information may be the data registered in the management server 2 per se, and in this case, the auction server 2 may only act as a stopover point in the transmission of the item information from the management server 2 to the user device.

Additionally, in an embodiment, the auction server 3 further includes a data updating unit 35. The data updating unit 35 serves to update the item information by transmitting the auction results to the management server 2 each time the auction for a single vehicle or a preset unit number of vehicles ends.

Further, in an embodiment, the auction server 3 further includes a streaming unit 36. The streaming unit 36 serves to transmit the audio and/or video broadcast streaming data received from the external server 7 to the user device of the auction participant during the auction.

FIG. 4 is a flowchart of the real-time auction method according to an embodiment.

Referring to FIG. 4, when the seller transmits the item information from the user device 1 to the management server 2 (S1), the management server 2 may register the transmitted item information as an auction item in a database of the management server 2 (S2). Herein, the seller may further transmit, to the management server 2, his/her desired lowest winning bid price for the corresponding item and/or information about whether the seller wants the post-consultation auction for the corresponding item. The post-consultation auction refers to a re-auction process performed after the failed auction since the bid price of the initial auction conducted in real time is less than the lowest winning bid price of the seller.

Then, the user who wants to participate in pre-bidding may submit the pre-bid for the item to the management server 2 through the user device 1 (S3). In this instance, the pre-bidding participant may set the pre-bid price that refers to the highest price that he/she is willing to pay when submitting the pre-bid.

The management server 2 may register auction information including the received item information and pre-bid information in the auction server 3 (S4). Subsequently, the auction server 3 may conduct the real-time auction via communication with the user device 5 of at least one auction participant (S5). In this instance, the auction time of each item is preset, and the auction participants may check the auction time by accessing the management server 2 and/or the auction server 3 on the user devices 5 by the API method. When the auction time is reached, the management server 2 and/or the auction server 3 may allow the auction participant to search a list of items on sale upon accessing.

FIG. 5 is a flowchart showing the real-time auction process by the real-time auction method according to an embodiment.

Referring to FIGS. 4 and 5, first, the auction server 3 may separate the item information and the bid information that will be transmitted through separate data packets to conduct the real-time auction (S51). However, the separation process refers to the conceptual information separation, and does not necessarily represent a physical process of splitting the data package into two or more.

Then, the auction server 3 may provide the item information having a lower need for real-time updates, for example, the vehicle information, the entry number and the next item to the user device 5 via the first communication connection (S52), and information having a higher need for real-time updates, for example, the bid history of another user, the bid price, the bidding user and the remaining time to the user device 5 via the second communication connection (S53). Additionally, the auction server 3 may update the bid information of the users' bids via communication with the user devices 5 during the real-time auction (S54), and broadcast it to the user devices 5 of all the participants who participate in the auction. Further, the auction server 3 may take the ordinary measures necessary to conduct the auction, for example, auction start and end, time control, forced bid success and forced bid failure.

Meanwhile, in case that pre-bidding for the item exists and the user set the pre-bid price, the auction server 3 may conduct the automatic bidding with the lowest price that is higher than the bid price of another user on behalf of the user until the bid price exceeds the pre-bid price. The above operation may be performed by an automatic bidding unit 342 of the auction management unit 34 shown in FIG. 3. Additionally, in case that there is no other bidding user, the automatic bidding is conducted at the starting price of the auction.

For example, assume that the starting price of the auction is 1,000 dollars, the pre-bid price of the pre-bidding user is 1,500 dollars, and bids are placed by 100 dollars. In this case, when there is no other user than the pre-bidding user, the automatic bidding unit 342 bids at the auction starting price, 1,000 dollars. Subsequently, when another user bids with 1,100 dollars, the automatic bidding unit 342 bids with 1,200 dollars on behalf of the pre-bidding user. Subsequently, when another user bids with 1,300 dollars again, the automatic bidding unit 342 bids with 1,400 dollars on behalf of the pre-bidding user. The above operation is only performed until the bid price of the user exceeds the pre-bid price during the pre-bidding. That is, when the automatic bidding was conducted at the pre-bid price of 1,500 dollars or the lowest price for bidding with a higher price than the bid price of another user exceeds the pre-bid price, 1,500 dollars, the automatic bidding is stopped and the winning bid is abandoned.

Additionally, in an embodiment, in addition to the pre-bid price of the pre-bidding user, the automatic bidding may be conducted, further taking the lowest winning bid price of the seller into account. When the pre-bid price is equal to or higher than the lowest winning bid price but the auction starting price is less than the lowest winning bid price, in case that there is no other competitive bidder, the automatic bidding is only conducted at the starting price and the bid price does not increases to the pre-bid price. In this circumstance, in case that the auction ends, the highest bid price is less than the lowest winning bid price, result in the failed bid, and thus even though there is no competitive bidder, the auction server 3 may conduct the automatic bidding with the increasing bid price until the bid price reaches the lowest winning bid price. In this instance, the auction server 3 may transmit the bid information indicating that there is competitive bidding by another virtual user to the auction participants including the pre-bidding user to prevent the exposure of the lowest winning bid price of the seller.

After the bid price reaches the lowest winning bid price through the automatic bidding, only when there is competitive bidding, the automatic bidding is conducted with the increasing bid price, and when the bid price or the lowest price for bidding with a higher price than another user reaches the pre-bid price, the automatic bidding is stopped.

When the highest bid price is determined through the auction for a limited time (for example, 5 minutes), the auction server 3 may determine whether the item succeeded or failed to sell based on the highest bid price (S55). When there is no lowest winning bid price set by the seller or the highest bid price of the auction is equal to or higher than the lowest winning bid price set by the seller, the sale of the corresponding vehicle is preliminarily determined and then finally determined through the seller's conformation. Alternatively, in another embodiment, the seller's confirmation process may be omitted. In contrast, when the highest bid price of the auction is less than the lowest winning bid price of the seller, the auction server 3 may designate the corresponding item as unsold.

In an embodiment, determination as to the success or failure of bids may be performed by a winning bid management unit 343 of the auction management unit 34 shown in FIG. 3. However, in another embodiment, the auction server 3 may only perform the function of transmitting the auction results to the management server 2, and the management server 2 having received the auction results may classify into items that sold at the auction and items that go unsold at the auction.

Referring back to FIG. 4, each time the auction for a single vehicle or a unit number of vehicles ends, the auction server 3 may update the item information of the management server 2 by transmitting the auction result information to the management server 2 (S6). Additionally, when the initial auction fails, the auction server 3 may inquire as to whether the seller applied for the post-consultation auction for the corresponding item through the management server 2, and when the post-consultation auction was applied for, may conduct the post-consultation auction for the unsold item (S7). In still another embodiment, the post-consultation auction may be conducted for all unsold items irrespective of whether or not the seller applied for the post-consultation auction.

FIG. 6 is a flowchart showing the post-consultation auction process of the real-time auction method according to an embodiment.

Referring to FIG. 6, the auction server 3 may collect the auction results including bid details in the failed initial auction (real-time auction) (S71). Subsequently, the auction server 3 may determine the starting price at the post-consultation auction based on the collected auction results (S72). In an embodiment, the starting price of the post-consultation auction may be the highest bid price at the real-time auction or the highest bid price of the bid details including the pre-bidding and the real-time auction. In another embodiment, the starting price of the post-consultation auction may be the sum of the highest bid price and a preset increment (for example, 50 dollars). The determination of the starting price of the post-consultation auction may be made by a price determination unit 341 of the auction management unit 34 shown in FIG. 3.

The starting price of the post-consultation auction is disclosed to bidders who participate in the post-consultation auction. Subsequently, the auction server 3 may start a bid with the determined action starting price and provide the item information and the bid information to the user device in the same way as the initial real-time auction (S73, S74), and update the bid information upon participation in the bid (S75). The above process is the same as the initial auction process and its detailed description is omitted. However, as opposed to the initial auction, in the case of the post-consultation auction, the auction server 3 may apply a particular restriction that the increment of the next bid price compared to the immediately preceding bid price should be equal to or higher than a predetermined level (for example, 100 dollars) to the post-consultation auction.

When the bid of the post-consultation auction ends, the auction server 3 may collect the bid price and determine the success or failure of the bid (S76). The success or failure of the bid at the post-consultation auction may be determined based on whether the bid price is equal to or higher than the lowest winning bid price set by the seller in the same way as the initial auction, but is not limited thereto, and the auction rules may be determined such that the seller is allowed to set the lowest winning bid price at the post-consultation auction separately from the initial auction, or the bidder with the highest price wins the bid without any lowest winning bid price at the post-consultation auction. Additionally, when there is no additional bid at the post-consultation auction, the success or failure of the bid is determined while maintaining the highest bidder and the highest bid price of the initial auction.

Referring back to FIG. 4, the auction server 3 may update the item information by transmitting the post-consultation auction results to the management server 2 after the end of the post-consultation auction (S8). Subsequently, the management server 2 may transmit the auction results to the user device 1 of the seller (S9). This may refer to allowing the seller to see the auction results through a web page, a mobile web page or a manager page, or transmitting the auction results to the user device 1 through a separate notification, for example, an e-mail, a text message and a push notification.

Meanwhile, when there is a pre-bidding user, the management server 2 may further transmit the auction results to the user device 4 of the pre-bidding user (S10).

As the auction is conducted by the three-tier scheme, pre-bidding, real-time auction and post-consultation auction as described in the foregoing embodiment, in the global auctions that have considerable time differences between auction participants and are difficult to determine appropriate market prices, it is possible to reflect the diverse needs of the participants.

Meanwhile, due to the presence of the post-consultation auction, there is a likelihood that potential buyers do not tend to participate in the real-time auction. To prevent this problem, the real-time auction system according to an embodiment may charge higher commissions on items sold through the post-consultation auction than the initial auction (real-time auction).

FIG. 7 is a conceptual diagram showing an exemplary User Interface (UI) on the user device using the real-time auction method according to an embodiment, showing the auction progress display. Meanwhile, before the start of the auction, the screen may display the countdown until the auction starts.

Referring to FIG. 7, during the auction, the screen of the user device may display the item information 710 such as an entry number 711, a vehicle image 713, a vehicle name 714 and a next item 712. Additionally, the screen of the user device may display the bid information 720 such as a countdown bar 721 showing the remaining time, a bid status message 722 and a next bid price 723. In this instance, each of the item information 710 and the bid information 720 may be received using separate data packet, and it is possible to reduce the time differences between bidders from different countries in the global auction by updating only the bid information 720 in a shorter cycle than the item information 710.

Meanwhile, the screen of the user device may display UI elements for operation, for example, backward 701, vehicle full image view 702, sound control 703, auction item list view 704, detailed vehicle information view 705 and bid 706. For example, when the item list view 704 element is selected, a list of items arranged according to the start time of the auction may be displayed on the screen.

Additionally, when the detailed vehicle information view 705 element is selected, detailed information of the vehicle corresponding to the item information, for example, entry number, manufacturer, model name, age, condition, mileage, fuel type, the number of cylinders, transmission, drive type and the presence or absence of auxiliary devices (a lock key, etc.) may be displayed on the screen. Further, the sound control 703 button may provide the function of controlling the sound of the broadcast audio and/or video provided with the bid information of the auction.

FIG. 8 is a conceptual diagram showing another exemplary UI on the user device using the real-time auction method according to an embodiment. In FIG. 8, the UI elements indicated by the same reference number shown in FIG. 7 perform the same function as those described with reference to FIG. 7, and to avoid redundancy, its detailed description is omitted.

Referring to FIG. 8, during the auction, the user device of the bidding participant may display the bid price 801 of the bidding participant in a different type, shape and/or color from the bid price of another user. Additionally, the immediately preceding bid price 802 may be displayed on the screen. When the user wants to bid, the user may check the next bid price 723, and place a bid by selecting the UI element 706 corresponding to "bid now". When the user bids, bid information is transmitted to other users.

The real-time auction method according to embodiments has been hereinabove described with reference to the flowchart presented in the drawings. Although the method is shown and described as a series of blocks for brief description, the present disclosure is not limited to the sequence of the blocks and some blocks may run in a different sequence from the sequence shown and described herein or concurrently with the other blocks, and a variety of different branches, flow paths and block sequences that achieve identical or similar results may be realized. Additionally, all the illustrated blocks may not be required to perform the method described herein.

The operation by the real-time auction method according to the above-described embodiments may be, at least in part, incorporated into a computer program and recorded in a computer-readable recording medium. The computer-readable recording medium having a program for performing the operation by the real-time auction method according to embodiments includes any type of recording device in which computer-readable data is stored. Examples of the computer-readable recording medium include read-only memory (ROM), random-access memory (RAM), compact disc read-only memory (CD-ROM), magnetic tape, floppy disk and an optical data storage device. Additionally, the computer-readable recording medium is distributed over computer systems connected via a network, and may store and execute a computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and it will be appreciated by those having ordinary skill in the art that various modifications and variations may be made thereto. However, it should be noted that such modifications fall in the technical protection scope of the present disclosure. Therefore, the true technical protection scope of the present disclosure should be defined by the technical spirit of the appended claims.

INDUSTRIAL APPLICABILITY

Embodiments relate to a real-time auction system and method and a computer program therefor. More particularly, embodiments relate to a real-time auction platform for conducting auctions by a three-tier scheme, pre-bidding, real-time auction and post-consultation auction, to meet the diverse needs of auction participants all over the world, and for reducing time differences between auction participants via communication of item related information and bid information using different data packets.

The invention claimed is:

1. A real-time auction system, comprising:
a management server configured to receive item information related to a product of a seller, and update the item information by receiving auction result information after an auction for the product is conducted; and
an auction server configured to provide the item information to a user device of at least one auction participant, conduct the auction for the product by transmitting bid information of the auction to the user device in real time, and transmit the auction result information to the management server,
wherein the auction server comprises a communication unit configured to transmit the item information and the bid information to the user device through different data packets,
wherein the auction server further comprises a winning bid management unit configured to update the bid information via communication with the user device and determine a success or failure of the auction based on the bid information,
wherein the management server is further configured to receive lowest winning bid price information from the seller, and to receive pre-bid information including a desired bid price from a pre-bidder before the auction starts, wherein the auction server further comprises an automatic bidding unit configured to bid on behalf of the pre-bidder until the desired bid price is reached from a starting price after the auction starts, and wherein the automatic bidding unit is configured to:
based on a determination that (i) a bid price is less than a lowest winning bid price indicated in the lowest winning bid price information and (ii) the desired bid price is greater than or equal to the lowest winning bid price, perform automatic bidding after the auction starts by increasing the bid price until the bid price reaches the lowest winning bid price, transmit, to a user device of the pre-bidder and the user device of the at least one auction participant, the bid information indicating one or more simulated bids generated during the automatic bidding, the one or more simulated bids emulating competitive bidding activity from a virtual user, to thereby inhibit an exposure of the lowest winning bid price to the pre-bidder and the at least one auction participant, and based on a determination that (i) the bid price is greater than or equal to the lowest winning bid price and (ii) there is a competitive bidding by another user, perform bidding on behalf of the pre-bidder until the bid price reaches the desired bid price, and wherein the automatic bidding is performed in response to transmission of the bid information indicating one or more simulated bids, while the bid price is less than the lowest winning bid price and the desired bid price is greater than or equal to the lowest winning bid price.

2. The real-time auction system according to claim 1, wherein the communication unit is further configured to transmit the item information to the user device via first communication connection and to transmit the bid information to the user device via second communication connection having a shorter update cycle than the first communication connection.

3. The real-time auction system according to claim 2, wherein the first communication connection and the second communication connection are different in at least one of a data format or a communication protocol.

4. The real-time auction system according to claim 1, wherein the winning bid management unit is further configured to designate the product as unsold when a highest bid price of an initial auction is less than the lowest winning bid price, and conduct a post-consultation auction for the product that goes unsold after the initial auction ends.

5. The real-time auction system according to claim 4, wherein the auction server further comprises a price determination unit configured to determine a starting price of the post-consultation auction based on the highest bid price of the initial auction.

6. A real-time auction method, comprising:
receiving, by a management server of a real-time auction system, item information related to a product from a seller;
receiving, by the management server, lowest winning bid price information from the seller;
receiving, by the management server, pre-bid information including a desired bid price from a pre-bidder before the auction starts;
providing, by an auction server of the real-time auction system, the item information to a user device of at least one auction participant, and conducting an auction for the product by transmitting bid information of the auction to the user device in real time;
transmitting, by the auction server, auction result information of the product to the management server; and
updating, by the management server, the item information using the received auction result information,
wherein the step of conducting the auction comprises:
transmitting, by the auction server, the item information and the bid information to the user device through different data packets, and
bidding, by the auction server, on behalf of the pre-bidder until the desired bid price is reached from a starting price after the auction starts, and
wherein the bidding on behalf of the pre-bidder comprises:
performing, by the auction server and based on a determination that (i) a bid price is less than a lowest winning bid price indicated in the lowest winning bid price information and (ii) the desired bid price is greater than or equal to the lowest winning bid price, automatic bidding after the auction starts by increasing the bid price until the bid price reaches the lowest winning bid price,
transmitting, by the auction server and to a user device of the pre-bidder and the user device of the at least one auction participant, the bid information indicating one or more simulated bids generated during the automatic bidding, the one or more simulated bids emulating competitive bidding activity from a virtual user, to thereby inhibit an exposure of the lowest winning bid price to the pre-bidder and the at least one auction participant, and
performing, by the auction server and based on a determination that (i) the bid price is greater than or equal to the lowest winning bid price and (ii) there is a competitive bidding by another user, bidding on behalf of the pre-bidder until the bid price reaches the desired bid price, and
wherein the automatic bidding is performed in response to the transmission of the bid information indicating one or more simulated bids, while the bid price is less than the lowest winning bid price and the desired bid price is greater than or equal to the lowest winning bid price.

7. The real-time auction method according to claim 6, wherein the step of transmitting to the user device through the different data packets comprises:
transmitting, by the auction server, the item information to the user device via first communication connection; and
transmitting, by the auction server, the bid information to the user device via second communication connection having a shorter update cycle than the first communication connection.

8. The real-time auction method according to claim 7, wherein the first communication connection and the second communication connection are different in at least one of a data format or a communication protocol.

9. The real-time auction method according to claim 6, further comprising,
after conducting the auction:
designating, by the auction server, the product as unsold when a highest bid price of an initial auction is less than the lowest winning bid price; and
conducting, by the auction server, a post-consultation auction for the product that goes unsold after the initial auction ends.

10. The real-time auction method according to claim 9, wherein the step of conducting the post-consultation auction comprises determining, by the auction server, a starting price of the post-consultation auction based on the highest bid price of the initial auction.

11. A computer-readable medium having stored therein a program for causing a computer to execute a process of performing a real-time auction, the process comprising:

receiving item information related to a product from a seller;

receiving lowest winning bid price information from the seller;

receiving pre-bid information including a desired bid price from a pre-bidder before the auction starts;

providing the item information to a user device of at least one auction participant, and conducting an auction for the product by transmitting bid information of the auction to the user device in real time;

transmitting auction result information of the product to a management server; and updating the item information using the received auction result information, wherein the step of conducting the auction comprises:

transmitting the item information and the bid information to the user device through different data packets, and bidding on behalf of the pre-bidder until the desired bid price is reached from a starting price after the auction starts, and wherein the bidding on behalf of the pre-bidder comprises:

performing, based on a determination that (i) a bid price is less than a lowest winning bid price indicated in the lowest winning bid price information and (ii) the desired bid price is greater than or equal to the lowest winning bid price, automatic bidding after the auction starts by increasing the bid price until the bid price reaches the lowest winning bid price, transmitting, to a user device of the pre-bidder and the user device of the at least one auction participant, the bid information indicating one or more simulated bids generated during the automatic bidding, the one or more simulated bids emulating competitive bidding activity from a virtual user, to thereby inhibit an exposure of the lowest winning bid price to the pre-bidder and the at least one auction participant, and performing, based on a determination that (i) the bid price is greater than or equal to the lowest winning bid price and (ii) there is a competitive bidding by another user, bidding on behalf of the pre-bidder until the bid price reaches the desired bid price, and wherein the automatic bidding is performed in response to the transmission of the bid information indicating one or more simulated bids, while the bid price is less than the lowest winning bid price and the desired bid price is greater than or equal to the lowest winning bid price.

12. The computer-readable medium according to claim 11, wherein the step of transmitting to the user device through the different data packets comprises:

transmitting, by an auction server, the item information to the user device via first communication connection; and transmitting, by the auction server, the bid information to the user device via second communication connection having a shorter update cycle than the first communication connection.

13. The computer-readable medium according to claim 12, wherein the first communication connection and the second communication connection are different in at least one of a data format or a communication protocol.

14. The computer-readable medium according to claim 11, wherein the process further comprises, after conducting the auction:

designating the product as unsold when a highest bid price of an initial auction is less than the lowest winning bid price; and conducting a post-consultation auction for the product that goes unsold after the initial auction ends.

15. The computer-readable medium according to claim 14, wherein the step of conducting the post-consultation auction comprises determining a starting price of the post-consultation auction based on the highest bid price of the initial auction.

* * * * *